UNITED STATES PATENT OFFICE.

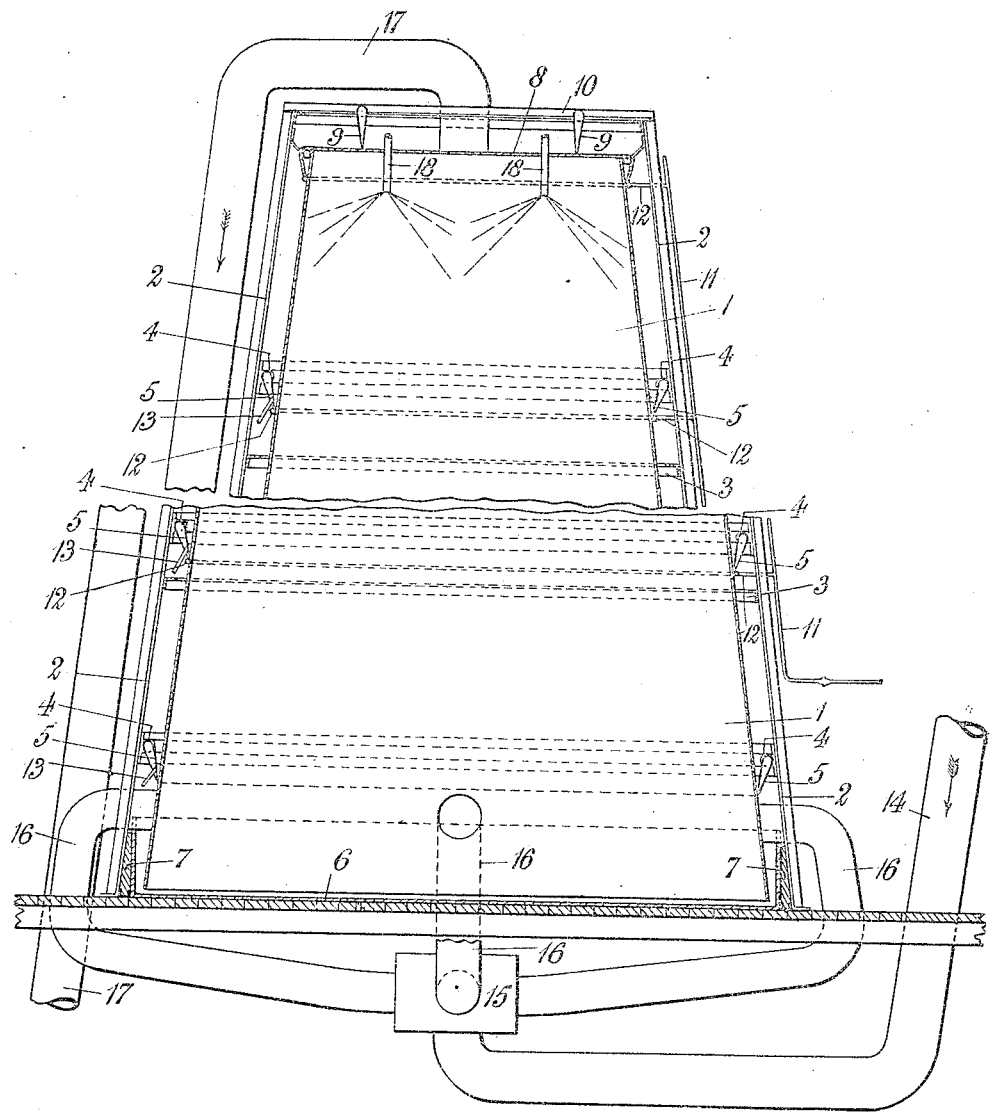

WILLIE GEORGE MILLS AND CHARLES TURNER PACKARD, OF IPSWICH, ENGLAND, ASSIGNORS TO EDWARD PACKARD AND COMPANY, LIMITED, OF IPSWICH, ENGLAND.

CHAMBER USED IN THE MANUFACTURE OF SULFURIC ACID.

1,112,546.  Specification of Letters Patent.  Patented Oct. 6, 1914.

Application filed March 21, 1914. Serial No. 826,148.

*To all whom it may concern:*

Be it known that we, WILLIE GEORGE MILLS and CHARLES TURNER PACKARD, subjects of the King of Great Britain, both residing at Bramford Works, Ipswich, England, have invented new and useful Improvements in the Chambers Used in the Manufacture of Sulfuric Acid, of which the following is a specification.

The object of this invention is to provide improved chambers for use in the manufacture of sulfuric acid.

According to our invention we form a lead chamber of the shape of a frustum of a pyramid, and preferably of a cone which is the limiting case of a pyramid, so that the walls slope outward from top to bottom, and we cause water to flow down the outer surface of the walls so as to keep the chamber cool.

The accompanying drawing which shows one way of carrying out the invention is a sectional elevation of such a tower.

The chamber 1 which is constructed of lead is carried by a framework built up of T iron standards 2 strengthened by angle iron rings 3.

4 are wrought iron or steel tubular rings carrying lead rings 5 each of which is burned to the chamber wall and forms a gutter or trough. The chamber is thus supported a small distance inside the framework, a suitable distance being 9 inches. This prevents any leakage of acid from the chamber falling onto the framework.

6 is the dish or tray made of lead the sides of which are supported by a ring of boards 7.

8 is the ceiling made of lead burned to the upper end of the chamber 1 and supported by lead straps 9 attached to cross bars 10 on the top of the framework.

The outside of the chamber is cooled by water supplied by the pipe 11 to branch pipes 12 encircling the chamber. The branch pipes 12 are provided with fine perforations through which the water is sprayed onto the chamber. The water trickles down the chamber to the troughs 5 from which it flows to waste or to a reservoir for further use through the drain pipes 13. The quantity of water is regulated according to the amount of cooling required. For example more water would be required on a hot day than on a cold one. The gas, coming in the case of the first chamber of a series from the Glover tower, and in the case of successive chambers from the preceding chamber is led by the pipe 14 to the distributing chamber 15 from which four trunks 16 lead to the chamber 1. The gas passes upward and passes out by the single trunk 17 in the center of the ceiling. A finely divided spray of water or nitrous vitriol or both may be introduced into the chamber through the pipes 18. In such apparatus the temperature of the chamber can readily be kept constant and the tendency of the gaseous mixture rising in the chamber to become less dense owing to the condensation of the acid mist is to a great extent counter-acted as the gas is constantly entering a portion of the chamber of less sectional area.

What we claim is:

1. In apparatus for the manufacture of sulfuric acid the combination of a chamber of the shape of a frustum of a pyramid and means for causing water to flow down the outer surface of the wall of the chamber.

2. In apparatus for the manufacture of sulfuric acid the combination of a chamber of the shape of a frustum of a pyramid, a framework, a trough connecting the chamber to the framework and means for causing water to flow down the outer surface of the wall of the chamber both above and beneath the trough.

3. In apparatus for the manufacture of sulfuric acid the combination of a chamber of the shape of a frustum of a pyramid, a framework, a water supply pipe surrounding the top of the outer surface of the wall of the chamber, a trough surrounding the wall of the chamber and connected to both the wall and the framework and a water supply pipe surrounding the outer surface of the wall of the chamber just beneath the trough.

WILLIE GEORGE MILLS.
CHARLES TURNER PACKARD.

Witnesses:
LEO JACOB,
S. C. HORNE.